United States Patent [19]

Mack et al.

[11] 4,219,639

[45] * Aug. 26, 1980

[54] TRANSPARENT AND TRANSLUCENT POLY(BUTENE-1)

[75] Inventors: Mark P. Mack; William J. Libbey, both of Ponca City, Okla.

[73] Assignee: Conoco, Inc., Ponca City, Okla.

[ * ] Notice: The portion of the term of this patent subsequent to Feb. 5, 1997, has been disclaimed.

[21] Appl. No.: 934,237

[22] Filed: Aug. 16, 1978

[51] Int. Cl.$^2$ ................................................ C08F 6/00
[52] U.S. Cl. .................................. 528/494; 526/348.6; 528/497; 528/498
[58] Field of Search .................. 528/494, 498, 497; 260/854, 862, 897 A; 526/348.6

[56] References Cited

U.S. PATENT DOCUMENTS

| | | | |
|---|---|---|---|
| 3,265,648 | 8/1966 | Boor et al. | 526/348.6 |
| 3,558,551 | 1/1971 | Gilbert et al. | 260/42.21 |
| 3,894,120 | 7/1975 | Frese et al. | 526/348.6 |

OTHER PUBLICATIONS

Polymer Letters, vol. 2, pp. 519–521 (1964).
Journal of Pol. Sci., Part A, vol. 3, pp. 3803–3813, (1965).
Polymer Letters, vol. 5, pp. 839–841 (1967).

*Primary Examiner*—Stanford M. Levin
*Attorney, Agent, or Firm*—Cortland R. Schupbach, Jr.

[57] ABSTRACT

A method for altering the transparency of a stable hexagonal polymorphic poly(butene-1) obtained from unstable tetragonal crystalline poly(butene-1) comprising contacting the tetragonal crystalline poly(butene-1) with a volatile solvent for a short time, then removing from the solvent, and allowing solvent adhereing to the poly(butene-1) to evaporate. The finished polymer can be opaque, transparent, or translucent depending upon the solvent and temperature used.

11 Claims, No Drawings

TRANSPARENT AND TRANSLUCENT POLY(BUTENE-1)

This invention relates to a method for altering opaque poly(butene-1). More particularly, this invention relates to a method for preparing transparent and translucent poly(butene-1) (also called poly-1-butene) by application of non-polar volatile solvent and allowing said solvent to evaporate.

The art has long recognized that crystalline alpha-olefins exhibit polymorphism (alternately called phases, types or forms). In particular, isotactic poly(butene-1), exists in at least four distinct crystalline forms. This polymorphic behavior of PB was first reported by Natta and co-workers in *Nuovo Cimento,* 15, special number 152 (1962). The X-ray and density properties of the polymers were further studied by Zannetti et al. and reported in *Chim. Ind.,* 43, 735 (1961).

Cooling a fresh melt of poly(butene-1) results in the formation of unstable tetragonal crystallites referred to by the previous workers as Type II poly(butene-1). These crystals gradually transform upon standing at room temperature to a more stable hexagonal polymer called Type I poly(butene-1). Complete Type II to Type I transformation usually occurs in a period of time ranging from about a day to more than a week, depending on such variables as molecular weight, copolymerization, pressure, temperature and the presence of impurities. Descriptions of such transformations can be found in *Polymer Letters* and the Journal of *Polymer Science,* Volume II, pp. 519–521 (1964). This reference describes the various phase transformations of poly(butene-1) through various processing conditions including the hexagonal stable Type I, the tetragonal unstable Type II and the orthorhombic stable Type III. Further discussions of these transformations can be found in the *Journal of Polymer Science,* Part. A, Volume 3, pp. 3803–3813 (1965), I. D. Rubin; and the Journal of Polymer Science, *Polymer Letters,* Volume 5, pp. 839, 841 (1967) by Schaffhauser. These references, while not exhaustive, are representative of the art in the area which teaches the effect of phase transformations.

Concisely, the unstable Type II form of poly(butene-1) is colorless, transparent, soft and easily deformed. In contrast, the stable Type I polymer is colorless, translucent or opaque, rigid and not prone to physical deformation. In commercial applications, melts of poly(butene-1) which are formed into desired shapes are of the Type II form (easily deformable) and are usually allowed to age into a Type I form. This transition to a Type I form often yields finished products with undesirable shape changes and changes in optical properties. Therefore, a process which will retain the optical properties during a Type II to Type I transformation has definite practical purposes.

One of the most important optical properties that a polymer may possess is transparency. Transparency is defined for the purposes described herein as the ability to transmit light without appreciable scattering so that bodies lying beyond the transparent piece are visible. More broadly, it could be defined as the ability to see through the poly(butene-1). Stereoregular polymers such as poly(butene-1) vary greatly in clarity from highly transparent to completely opaque. This phenomenon is due to the individual components that make up the crystalline polymer. Between opaque and transparent, the polymer obtains a state of translucency, which could be defined as a partial transparency by admitting and diffusing lights such that objects beyond the article which is translucent can not be clearly distinguished. Opaque articles are those impervious to the rays of visible light and which are not transparent or translucent, and allow no definition of objects beyond the article.

A polymer is regarded as a heterogeneous mixture with components or aggregates having individual refractive indices. The size of the aggregates of radiating crystals or spherulites determines the heterogeneity of the polymer. A material is transparent if the dimensions of the spherulites are less than the wavelength of light. In contrast, a material appears to be opaque if there exists a diffusion of light due to spherulites with the same dimension as that of the wavelength of incident light. Generally, it is believed a slow rate of crystallization for a polymer results in spherulites of a size capable of interfering with light, thus the opacity or translucency obtained with Type I poly(butene-1) during the slow one to seven or more days transformation from Type II to Type I. This is also true for copolymers of poly(butene-1) where the comonomer is in concentrations below about 10 percent by weight (above about 90% by weight of poly(butene-1). For example, amounts of polyethylene below about 10 percent can give opaque or translucent articles. Other polymers which can be used are polypropylene, poly 4-methyl-1-pentene and poly 4-hexylpentene. Blended polymers which can be present (not as true copolymers) are polypropyleneoxide, polyethylene and polypropylene, polyesters, polyamides, polyurethanes and polyaramides. Mixtures of these can be used.

Therefore, a slow rate for the Type II to Type I phase transformation in isotactic poly(butene-1) results in a material which is translucent. It would be of great benefit to provide a method for creating transparent poly(butene-1) for use in pipes, lenses, containers and other applications which require transparency.

It is therefore an object of the present invention to provide a method for altering the opaque properties of stable hexagonal poly(butene-1) polymers. Other objects will become apparent to those skilled in this art as the description proceeds.

It has now been surprisingly discovered that when an opaque stable hexagonal polymorphric poly(butene-1) is placed in an unstable tetragonal crystallite form, the optical properties can be altered by contacting the fresh melt poly(butene-1) with a volatile, non-polar solvent and immediately evaporating the solvent from the sample. The unstable form can be obtained from melts, solvents and other methods known to those skilled in this art.

The optical properties of the opaque Type I material can be altered to any form from transparent to translucent, the degree of alteration depending upon the solvent and the temperature used in contacting the unstable poly(butene-1) form.

Solvents useful in the practice of the instant invention are nonpolar solvents which have a reflux temperature of about 140° C. or less. Non-polar solvents having a higher temperature of reflux can be used, but only when the contacting is carried out in at least a partial vacuum to give an effective temperature of around 140° C. or less. Representatives of examples of those solvents whose reflux temperature is 140° C. or less are n-hexane, n-heptane, n-pentane, n-octane, ethyl ether, diisopropyl ether, n-butane, n-nonane and n-decane. Of these, n-hexane, n-pentane, n-heptane, n-octane and diisopropyl ether are preferred. Materials such as cyclohexane can be used to produce a translucent material.

Generally, a preferred temperature for contacting the fresh melt of poly(butene-1) is from about 40° C. to about 90° C., but temperatures of from about 0° C. to about 140° C. can be used. It must be realized that the temperatures can vary slightly depending upon the pressures used during the contacting stage.

Concisely explained, the method of the instant invention consists of preparing a fresh melt of Type I poly(butene-1) to form a Type II poly(butene-1), then contacting the fresh melt Type II material with a volatile non-polar solvent maintained at a temperature which will produce the desired optical properties, removing the Type II poly(butene-1) from the solvent and allowing the solvent to rapidly evaporate to produce predominantly Type I poly(butene-1) having altered optical properties.

Normally, transparent instead of translucent material will be preferred. Preferred conditions for preparing transparent polymers are temperatures of from 40°-90° C. and solvents selected from the group consisting of n-hexane, n-pentane, n-heptane, n-octane, diisopropyl ether and n-butane.

Preferred conditions for producing translucent polymers are temperatures of from 0° C. to about 40° C. and solvents selected from the group consisting of n-hexane, n-heptane, n-pentane, n-octane, cyclohexane, diethyl ether, diisopropyl ether, n-nonane, n-decane, ethane and propane.

The instant invention is more concretely described with references to the examples below wherein all parts and percentages are by weight unless otherwise specified. The examples are provided to exemplify the instant invention and not to limit it. The test used to quantify the transparency of polymer films is described in U.S. Pat. No. 3,558,551, said method hereby incorporated by reference. Concisely, the method describes the ability to distinguish a one-eighth letter test and the ability to distinguish a one and one-quarter inch letter measured as distance behind the article in inches.

EXAMPLE 1

Crystalline, isotactic poly(butene-1) was prepared using the conventional Ziegler-Natta catalyst combination, consisting of a mixture of diethylaluminum-chloride and titanium trichloride. The monomer, 1-butene, was used as a solvent for the polymerization reaction. The precipitated polymer was 93.9% insoluble in boiling diethyl ether and had a specific viscosity of 0.565 in decalin at 115° C. A 0.013 inch thick film of stable poly(butene-1) was heated to 150° C. and cooled to room temperature producing the Type II polymer. The existence of the Type II polymorph was confirmed using infrared techniques, the various polymorphs of poly-1-butene such as Types I, II and III exhibiting unique infrared spectra as described by Clampitt et al in the *Journal of Polymer Science*, C6, pp. 143-151 (1964). These characteristics spectra were used to confirm the existence of the various polymorphs in all experiments. The Type II and Type I crystallites exhibit absorption peaks at 900 and 925 cm$^{-1}$, respectively. The extent of the Type II to Type I transformation was determined by comparing the relative intensities of the absorption bands.

After melting the sample of poly(butene-1), the infrared spectra revealed the exclusive existence of the Type II polymorph. The film was then dipped into a beaker containing boiling n-hexane for two seconds, then withdrawn. The solvent was allowed to evaporate from the surface of the film. The sample was analyzed using infrared techniques which indicated that more than 50 percent of the Type II crystallites had been transformed to the Type I structure. The film remained colorless and transparent.

A comparative example was carried out using a second 0.013 inch thick film of stable poly(butene-1) which was heated to 150° C. and cooled to room temperature. The infrared spectra of the sample showed the presence of the Type II structure exclusively. The extent of the Type II to Type I transformation was determined by comparing the relative intensities of the absorption bands at particular times. The half-life of the Type II to Type I process for the control sample at room temperature in air was 23.5 hours, and the sample was translucent, not transparent.

In Examples 2 through 4 below, three strips measuring 4×1×0.0033 inches of commercial grade poly-(butene-1) co-polymer containing 5-10 weight percent polyethylene were used. The samples were heated to 140°-150° C. for 10 minutes to form the unstable Type II crystallites, and then allowed to cool immediately to room temperature.

EXAMPLE 2

One-half of a sample of Type II poly(butene-1) was dipped into a beaker containing n-hexane at room temperature for two seconds, then withdrawn. The solvent was then allowed to evaporate from the surface of the film. The treated portion of poly(butene-1) was highly translucent, almost opaque, while the untreated half remained transparent. The solvent-treated portion was analyzed using infrared techniques which showed that a 52 percent Type II to Type I phase transformation had taken place. The infrared spectra for the untreated portion indicated that a phase change had not taken place. Thus, dipping a sample of poly(butene-1) in a solvent at room temperature followed by its evaporation results in a translucent to opaque product.

EXAMPLE 3

One-half of a poly(butene-1) strip was dipped into a beaker containing boiling n-hexane for a few seconds, then withdrawn. The solvent was allowed to evaporate in air at room temperature. The treated side showed a significant Type II to Type I phase acceleration (54 percent Type I poly(butene-1) and remained transparent. The untreated portion showed a strong absorption at 900 cm$^{-1}$ in the infrared region indicating that a phase change had not occurred. After 72 hours, the treated portion remained colorless and transparent while the untreated side was translucent due to the phase change.

EXAMPLE 4

One-half of a strip of poly(butene-1) was dipped into a beaker containing n-heptane at 90°-95° C. for two seconds, then withdrawn. The solvent was allowed to evaporate in air at room temperature. The treated portion showed a 56 percent Type II to Type I phase change by infrared techniques. The entire sample, however, remained colorless and transparent. The treated portion was re-analyzed in the infrared region after 2.5 hours and showed a further increase to greater than 60 percent Type I crystallites. The sample remained transparent.

Examples 5 through 7 used three plaques of poly(butene-1) 0.071 inches thick. The procedure described in Examples 2, 3 and 4 were repeated. The hexane-treated sample contacted at room temperature was translucent immediately after treatment. The control sample remained colorless and transparent during this time lapse. After 7 days, the control material became translucent. However, the sample of poly(butene-1) that was contacted with boiling hexane remained transparent throughout the experiment.

EXAMPLES 8 THROUGH 15

A polymer possessing an isotactic index of 97.8 percent and a specific viscosity of 0.600 in decalin at 115° C. was pressed into a translucent sheet of poly(butene-1) 0.0009 inches thick. Eight test strips were cut from the sheet and heated in an oven to 150° C. to induce a complete Type I to Type II phase shift. The samples were then cooled immediately to room temperature. The polymer films were colorless as well as transparent after heat treatment. The infrared spectra for each strip was determined and each strip showed the exclusive existence of unstable Type II crystal structure. In Example 8 and in Examples 10 through 15, the Type II poly(butene-1) test strips were dipped into beakers containing volatile hydrocarbon materials for a few seconds and withdrawn. The solvent was allowed to evaporate in air at room temperature. In Example 8, the Type II poly(butene-1) strip was contacted with various solvents at various temperatures as follows: in Example 8, boiling hexane at 69° C.; Example 10, boiling n-pentane at 36° C.; Example 11, n-heptane at 82° C.; Example 12, n-octane at 82° C.; Example 13, boiling cyclohexane at 82° C.; Example 14, boiling diethyl ether at 35° C.; and Example 15, boiling diisopropyl ether at 69° C.

Example 9 was a control run which was not contacted with a volatile non-polar solvent. The test strip was simply stored for 10 days at room temperature and atmospheric pressure.

In all samples carried out above, the test strips were stored for 10 days at room temperature and atmospheric pressure after contact with the solvent. All strips, including the control, were tested for clarity on the tenth day. The test used was similar to the test described in U.S. Pat. No. 3,558,551. The poly(butene-1) test strips were placed 6 inches from a viewer's eye. The maximum see-through value from which figures could be easily discerned was determined by measuring the distance in inches between an eye chart with letters one-half inch in height and the polymer sheet. The distance between the eye chart and the polymer film was varied, while the distance between the film and the viewer's eye was held constant. The clarity of the film was determined through the use of a formula wherein clarity is equal to the see-through distance of the sample divided by the see-through distance of the control sample.

Values greater than 1 represent a material which is more transparent than the control sample, wherein values less than 1 indicate a material more translucent than the control sample. The results of Examples 8 through 15 are set forth in Table I below.

TABLE I

| Example | Contact Solvent | Temp. of Solvent (°C.) | See-through distance (inches) | Clarity |
|---|---|---|---|---|
| VIII | n-hexane | 69 | 18.5 | 12.3 |
| IX | control |  | 1.5 | 1 |
| X | n-pentane | 36 | 14.0 | 9.3 |
| XI | n-heptane | 82 | 10.25 | 6.8 |
| XII | n-octane | 82 | 5.75 | 3.8 |
| XIII | cyclohexane | 82 | 1.5 | 1.0 |
| XIV | diethyl ether | 35 | 2.5 | 1.7 |
| XV | diisopropyl ether | 69 | 13.5 | 9.0 |

An examination of the data clearly shows that contacting a fresh melt of Type II poly(butene-1) with a boiling, non-polar hydrocarbon solvent, or a near-boiling solvent for a few seconds followed by immediate evaporation of the solvent will improve the transparency or clarity of the polymer. The data also clearly shows that various solvents and temperature conditions are more effective than others in improving clarity.

The temperature of the solvent should be lower than 90° but above room temperature for hydrocarbons that boil above room temperature at atmospheric pressure. Contacting poly(butene-1) at room temperature within hexane at atmospheric pressure will result in a translucent sample. However, contacting a poly(butene-1) sample with volatile materials at temperatures above 90° C. or lower than room temperature to afford transparency is considered to be within the scope of the present invention. It is clear that the conditions of temperature, solvent and pressure can be varied to obtain the desired result.

EXAMPLES 16–21

Poly(butene-1) with an isotactic index of 97.8% and a specific viscosity of 0.600 in decalin was compression molded into a plaque 0.0009 inches thick. Six test strips were cut from the plaque and heated to 150° C. then cooled immediately to induce a complete I to II phase change. In examples 16–18 and in examples 19–21 the test strips were dipped into beakers containing n-hexane at various temperatures from 5° C. to reflux for a few seconds and withdrawn. The solvent was allowed to evaporate in air at room temperature. In example 16 the poly(butene-1) strip was contacted with boiling n-hexane at 70° C.; in example 17 with n-hexane at 60° C.; in example 18 with n-hexane at 56° C.; in example 20 with n-hexane at 23° C.; and in example 21 with n-hexane at 5° C. Example 19 represents a control run. After removing the strip from the oven, the polymer sheet was allowed to phase transform from its unstable type II structure to a type I form in air at room temperature and atmospheric pressure. The test strips were stored for 10 days and its clarity was determined. A ½" letter test was used and the following results were determined.

Table II

| Example | Contact Solvent | Temp. of Solvent (°C.) | See-through distance (inches) | Clarity |
|---|---|---|---|---|
| 16 | n-hexane | 70 | 4¾ | 9.50 |
| 17 | n-hexane | 60 | 3¾ | 7.50 |
| 18 | n-hexane | 56 | 2 | 4.00 |
| 19 | control | — | ½ | 1.00 |
| 20 | n-hexane | 23 | ½ | .250 |
| 21 | n-hexane | 5 | 1/16 | .125 |

The data revealed that contacting a fresh melt of type II poly(butene-1) with a solvent such as n-hexane at or near its boiling point for a few seconds followed by the solvent's immediate evaporation will improve the transparency of the polymer. Contacting the poly(butene-1) at low temperatures, for example, with n-hexane at 5° C., will produce a more translucent sample.

Contact time for the sample can vary depending upon the thickness of the sample and the solvents used. However, normally contact time will range from ½ to 15 seconds, although from about 1½ to about 5 seconds is preferred.

While representative embodiments and details have been shown for the purpose of illustrating the instant invention, it will be apparent to those skilled in this art that various changes and modifications may be made therein without departing from the spirit and the scope of the invention.

I claim:

1. A method for obtaining a stable transparent hexagonal poly(butene-1) comprising placing said polybutene-1 in an unstable tetragonal crystallite form and contacting said unstable polybutene-1 with a volatile non-polar solvent having an effective reflux temperature of about 40° C. to about 140° C. and immediately evaporating the solvent.

2. A method as described in claim 1 wherein the contact temperature is from about 50° C. to about 90° C.

3. A method as described in claim 2 wherein the solvent is within 5 degrees of reflux at contact pressure.

4. A method as described in claim 2 wherein the solvent is selected from the group consisting of n-hexane, n-pentane, n-heptane, n-octane, diethyl ether, diisopropyl ether, n-butane, n-nonane and n-decane.

5. A method as described in claim 4 wherein the solvent is selected from the group consisting of n-pentane, n-heptane, n-hexane, n-octane, and diisopropyl ether.

6. A method for obtaining a stable translucent hexagonal poly(butene-1) comprising placing said poly(butene-1) in an unstable tetragonal crystalline form and contacting said unstable poly(butene-1) with a volatile non-polar solvent having an effective reflux temperature of about 0° to about 40° C. and immediately evaporating the solvent.

7. A method as described in claim 6 wherein the solvent is selected from the group consisting of n-hexane, n-heptane, n-pentane, n-octane, cyclohexane, diethyl ether, diisopropyl ether, n-nonane, n-decane, n-butane, propane and ethane.

8. A method as described in claim 7 wherein the poly(butene-1) is a copolymer or blend containing at least about 90% poly(butene-1).

9. A method as described in claim 8 wherein the copolymer is formed by monomers selected from the group consisting of propylene, ethylene, 4-methyl-1-pentene and mixtures of these with butene.

10. A method as described in claim 9 wherein the poly(butene-1) is blended with a polymer selected from the group consisting of polyesters, polyamides, polyaramides, polyethylene, polypropylene, polyurethanes, polypropyleneoxides or mixtures of these.

11. A method as described in claim 6 wherein the polybutene-1 is contacted as a film.

* * * * *